(12) United States Patent
Dixon, Jr. et al.

(10) Patent No.: US 8,191,956 B1
(45) Date of Patent: Jun. 5, 2012

(54) VEHICLE WITH AERODYNAMIC SYSTEM

(75) Inventors: Robert James Dixon, Jr., Chino Hills, CA (US); Jeffrey J. Bennett, South Pasadena, CA (US)

(73) Assignee: Utility Trailer Manufacturing Company, City of Industry, CA (US)

( * ) Notice: Subject to any disclaimer, the term of this patent is extended or adjusted under 35 U.S.C. 154(b) by 0 days.

(21) Appl. No.: 12/757,827

(22) Filed: Apr. 9, 2010

(51) Int. Cl.
*B62D 35/00* (2006.01)

(52) U.S. Cl. .................. 296/180.4; 296/180.1

(58) Field of Classification Search .............. 296/180.1, 296/180.4, 181.5, 187.03, 187.12; 180/903
See application file for complete search history.

(56) References Cited

U.S. PATENT DOCUMENTS

| | | | | |
|---|---|---|---|---|
| 3,711,146 | A | | 1/1973 | Madzsar et al. ............... 296/1 S |
| 4,262,953 | A | | 4/1981 | McErlane .................... 296/1 S |
| 4,486,046 | A | | 12/1984 | Whitney et al. ............... 296/1 S |
| 4,611,847 | A | | 9/1986 | Sullivan ...................... 296/1 S |
| 4,640,541 | A | | 2/1987 | FitzGerald et al. ............ 296/1 S |
| 4,746,160 | A | | 5/1988 | Wiesemeyer .................. 296/1 S |
| 5,280,990 | A | | 1/1994 | Rinard ....................... 296/180.1 |
| 5,375,882 | A | | 12/1994 | Koch, III ...................... 280/851 |
| 5,609,384 | A | | 3/1997 | Loewen ...................... 296/180.4 |
| 6,685,256 | B1 | | 2/2004 | Shermer ...................... 296/180.4 |
| 6,722,730 | B2 | | 4/2004 | Lydan et al. .................. 296/191 |
| 6,755,460 | B1 | | 6/2004 | Marrs et al. ............... 296/187.12 |
| 7,093,889 | B2 | * | 8/2006 | Graham ...................... 296/180.4 |
| 7,163,258 | B2 | | 1/2007 | Dyer, II et al. ................ 296/191 |
| 7,497,502 | B2 | * | 3/2009 | Wood ........................ 296/180.4 |
| 7,578,541 | B2 | * | 8/2009 | Layfield et al. ............. 296/180.2 |
| 7,686,385 | B2 | * | 3/2010 | Dolan et al. .................. 296/191 |
| 7,740,303 | B2 | * | 6/2010 | Wood ........................ 296/180.4 |
| 7,748,772 | B2 | * | 7/2010 | Boivin et al. ............... 296/180.4 |
| 7,780,224 | B2 | * | 8/2010 | Roush ....................... 296/180.4 |
| 7,877,120 | B2 | * | 1/2011 | Jacobs et al. ............... 455/575.1 |
| 2006/0152038 | A1 | * | 7/2006 | Graham ..................... 296/180.1 |
| 2007/0120397 | A1 | * | 5/2007 | Layfield et al. ............ 296/180.4 |
| 2007/0176466 | A1 | * | 8/2007 | Dolan et al. ............. 296/203.03 |
| 2008/0093887 | A1 | * | 4/2008 | Wood ........................ 296/180.4 |
| 2008/0116702 | A1 | * | 5/2008 | Enz et al. ...................... 293/128 |
| 2008/0303311 | A1 | * | 12/2008 | Roush ....................... 296/180.4 |
| 2009/0189414 | A1 | * | 7/2009 | Boivin et al. ............... 296/180.4 |
| 2009/0218848 | A1 | * | 9/2009 | Boivin et al. ............... 296/180.4 |
| 2009/0230726 | A1 | * | 9/2009 | Reiman et al. ............. 296/180.4 |
| 2010/0096880 | A1 | * | 4/2010 | Boivin et al. ............... 296/180.4 |
| 2010/0096881 | A1 | * | 4/2010 | Boivin et al. ............... 296/180.4 |
| 2010/0096882 | A1 | * | 4/2010 | Boivin et al. ............... 296/180.4 |
| 2010/0096883 | A1 | * | 4/2010 | Boivin et al. ............... 296/180.4 |
| 2010/0098481 | A1 | * | 4/2010 | Boivin et al. ................... 403/24 |
| 2010/0187856 | A1 | * | 7/2010 | Boivin et al. ............... 296/180.4 |

* cited by examiner

*Primary Examiner* — Glenn Dayoan
*Assistant Examiner* — Gregory Blankenship
(74) *Attorney, Agent, or Firm* — Connolly Bove Lodge & Hutz LLP

(57) ABSTRACT

A semi-trailer has an elongate bed with skirts depending there from adjacent to either side of the bed. The skirts are laterally flexible and can also flex vertically to overcome obstacles and objects. Elongate plates are mounted at one end to the underside of the bed adjacent one or the other of the depending skirts. The elongate plates extend inwardly beneath the bed and then diagonally downwardly to the adjacent skirt displaced below the attachment to the bed. Leaf springs are superimposed on the underside of the inward extensions of the elongate plates to preload the plates toward the bed of the semi-trailer. The skirts extend from landing leg assemblies on the semi-trailer to longitudinally adjacent the forward outboard tires of the wheel assemblies.

14 Claims, 5 Drawing Sheets

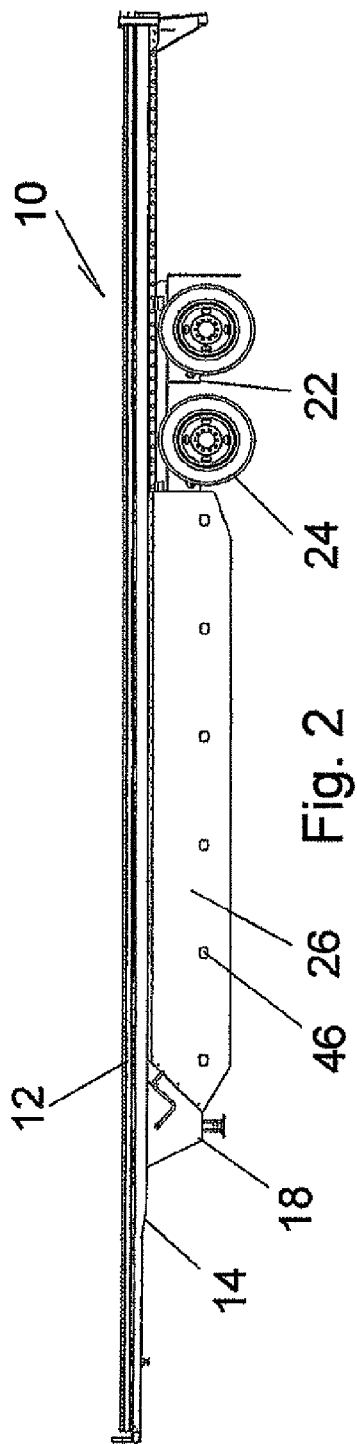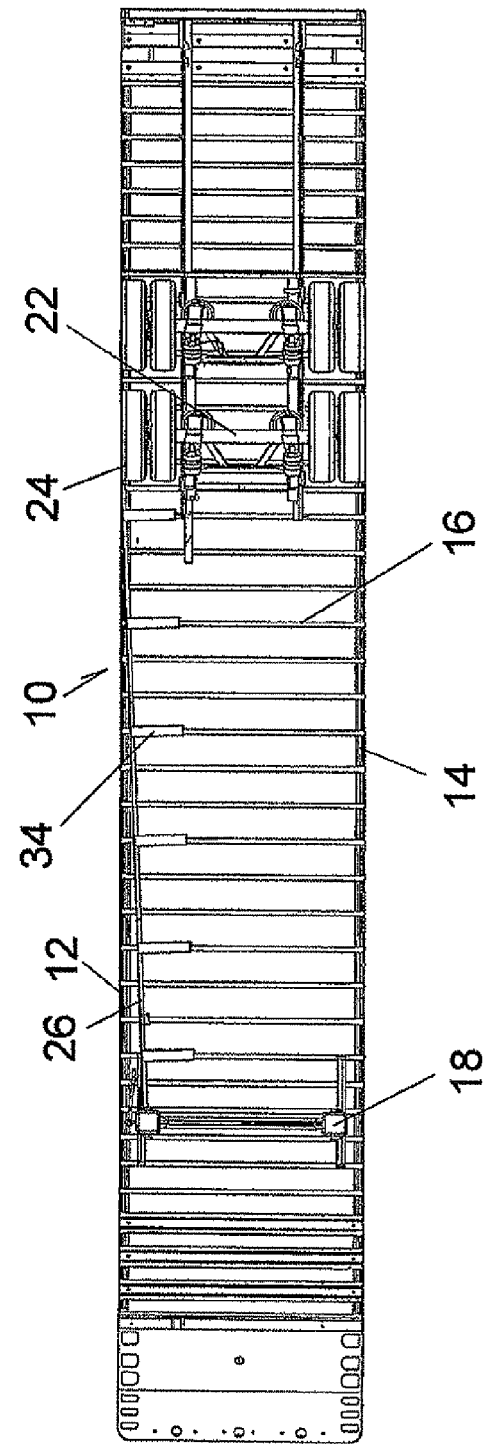

VEHICLE WITH AERODYNAMIC SYSTEM

BACKGROUND OF THE INVENTION

The field of the present invention is aerodynamic systems for the undercarriage of vehicles.

For some time, aerodynamic devices have been applied to vehicles as a means to reduce drag and enhance overall vehicle efficiency. Automobiles and motorcycles have used such devices added to or incorporated into the body of the vehicle for a great many years. In the last few decades, such devices have been incorporated into larger vehicles such as trucks. Fairings and air dams have been frequently used to streamline flow about the front of such vehicles. It has also been well known that skirts extending longitudinally along the sides of larger vehicles also reduce drag.

Although fairings have been widely accepted, skirts and other elements depending from the body of the vehicle are more problematic. Such devices can interfere with accumulated snow and ice on the roadway even with appropriate driving maneuvers. Other obstacles and objects can be accidentally or mistakenly contacted by such skirts as well. Such incidences can result in injury to the aerodynamic devices and/or to the elements encountered. Further, these difficulties can occur as the vehicle is being maneuvered with the impact on the skirts being either from inboard or outboard.

SUMMARY OF THE INVENTION

The present invention is directed to vehicles with an aerodynamic skirt system. The vehicle typically will have an elongate bed with space beneath the bed receiving the skirts extending longitudinally. Such systems are particularly applicable for large trucks and semi-trailers.

The aerodynamic system includes skirts adjacent to and depending from each side of the elongate bed of the vehicle. These skirts are of material able to absorb a fair amount of impact anticipated for the contemplated vehicle without functional or aesthetic degradation. Stabilizers are mounted to the underside of the bed near the skirts and extend to meet and be fixed to the adjacent skirt at a position displaced downwardly from the attachment to the vehicle bed. Each stabilizer includes a first plate which extends inwardly from an attachment beneath the vehicle bed near one of the skirts. A second plate then extends from that inwardly extending first plate to the attachment with the same skirt. These stabilizers accommodate either inboard or outboard movement of the associated skirt when the skirt encounters obstacles while driving and resiliently returns to a neutral depending position once free.

In one specific aspect of the present invention, each stabilizer operates to bend the second plate to accommodate inboard movement of the associated skirt. With outboard movement, the second plate is principally in tension with the first plate bending to accommodate outboard movement of the skirt. Once the encountered obstacle or object is passed, the stabilizer returns the skirt to its neutral dependant orientation relative to the bed of the vehicle. The geometry of the stabilizers provides advantageous force profiles in resisting skirt movement.

In a separate aspect of the present invention, leaf springs are superimposed on the first plates of the stabilizers. These springs are preloaded to bias the first plates toward the underside of the bed. In this way, the force profile can be better paired between inboard movement and outboard movement.

In another separate object of the present invention, each stabilizer is an elongate sheet which defines the first plate, the second plate and a transition curve joining the first and second plates. Other mechanisms to join the first and second plates are contemplated.

In a further separate aspect of the present invention, the stabilizers are located to be aligned with mechanisms under the bed of the vehicle to extend longitudinally from adjacent those mechanisms to adjacent the forward outboard rear tires. The skirts diverge from one another from the front toward the back.

In a final aspect, any of the foregoing separate aspects are contemplated to be employed together to further advantage.

Accordingly, it is an object of the present invention to provide an improved aerodynamic skirt for a vehicle. Other and further objects and advantages will appear hereinafter.

BRIEF DESCRIPTION OF THE DRAWINGS

FIG. 2 is a side view of the semi-trailer of claim 1.

FIG. 3 is a bottom view of the semi-trailer of FIG. 1.

DETAILED DESCRIPTION OF THE PREFERRED EMBODIMENT

Figure 1:
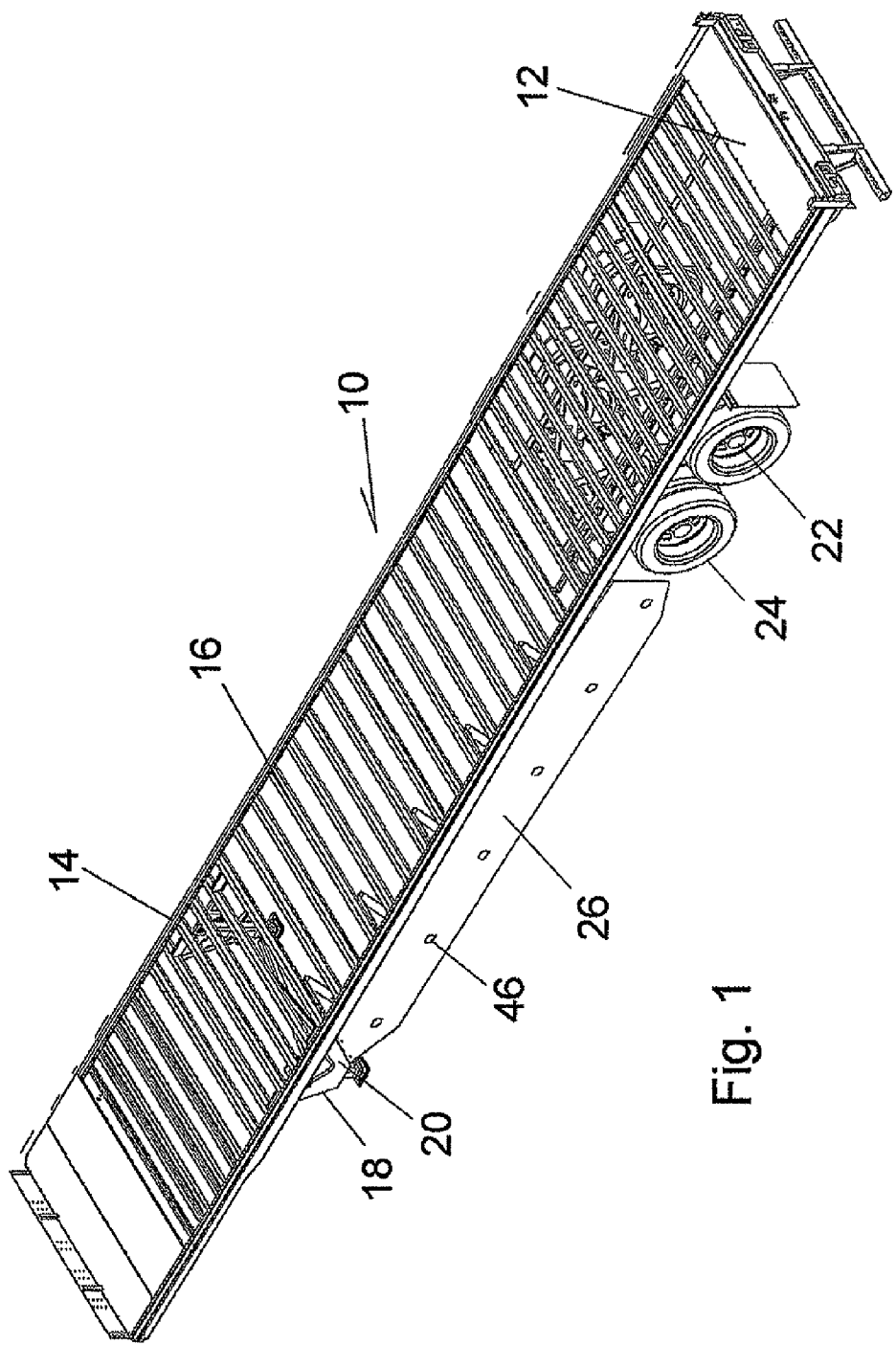
FIG. 1 is a perspective view of an incomplete semi-trailer bed with a skirt on one side thereof.
Figure 4:
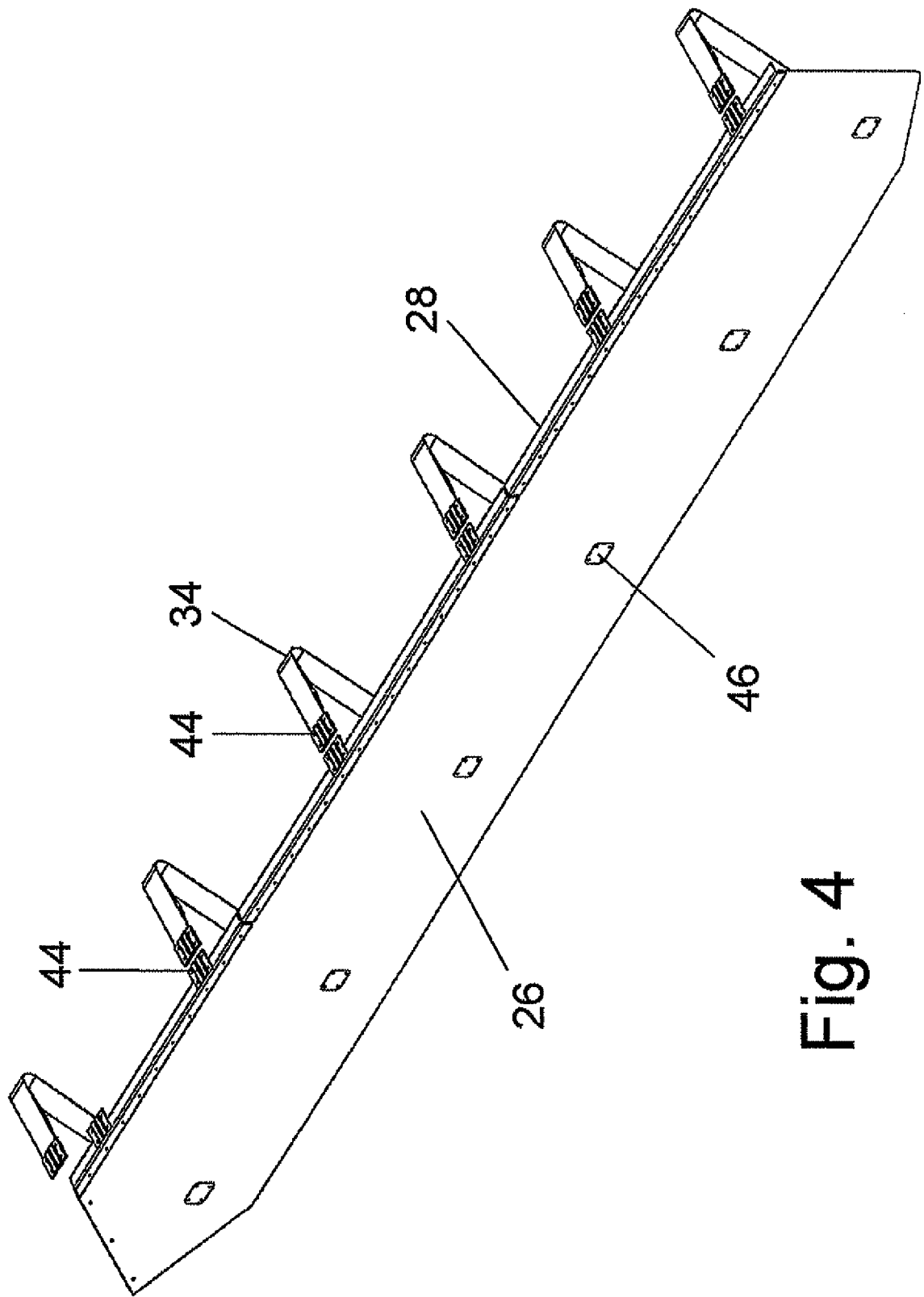
FIG. 4 is a perspective view of the skirt and stabilizers of FIG. 1.
Figure 5:
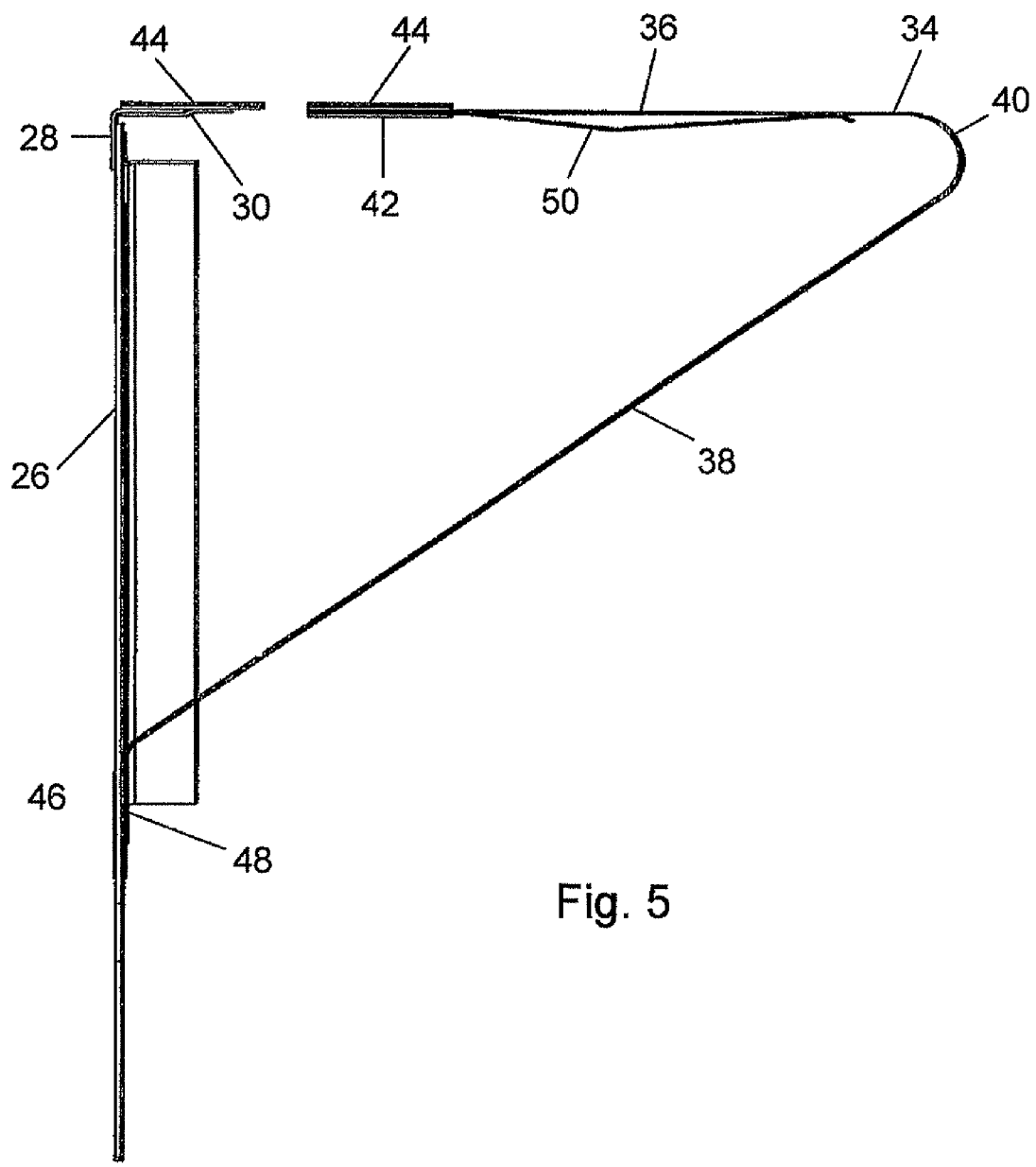
FIG. 5 is an end view of the skirt and stabilizer of FIG. 1.
Figure 6:
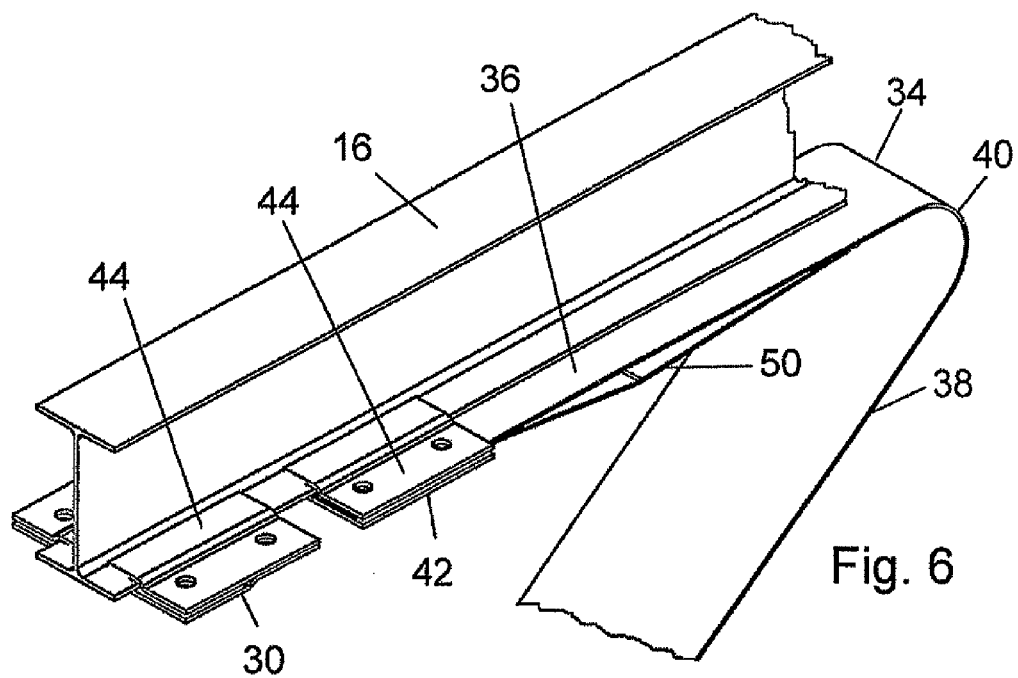
FIG. 6 is a perspective view of mounting assemblies for a skirt and an stabilizer.
Figure 7:
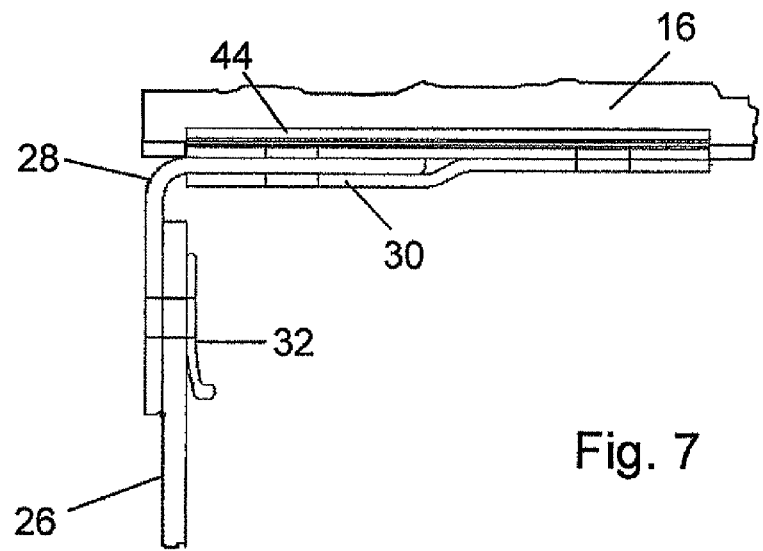
FIG. 7 is an end view of the mounting assembly for a skirt.

Turning in detail to the Figures, a semi-trailer 10 is shown with the bed surface removed for clarity. The semi-trailer 10 is an example. The present aerodynamic system will find great utility for full trailers and for trucks with integrated beds. Such vehicles may have flat beds or include enclosed cargo bodies or the like mounted to the bed 12, as examples. The elongate bed 12 includes a frame 14 generally rectangular in plan. I-beams 16 extend transversely across the frame to define the supporting structural bed plane.

Landing leg assemblies 18 are arranged toward the forward part of the semi-trailer 10 near each side of the bed 12. These assemblies include a structural wingplate 20 fixed to the trailer in alignment with the longitudinal extent of the trailer 10. Thus, the wingplates 20 define outboard surfaces of these mechanisms.

Wheel assemblies are located toward the aft of the trailer 10. These assemblies 22 include tires 24. The forward outboard tires are typically flush with the side of the bed 12.

Two skirts 26 are associated with the semi-trailer 10. These skirts are located adjacent the sides of the elongate bed 12 and extend between the wingplates 20 of the landing leg assemblies 18 and the forward outer tires 24 of the wheel assemblies 22. The skirts 26 are of sheet material which may be all one piece, riveted together as sections or lapped separate sections. The material of the skirt 26 is conveniently fiberglass reinforced plastic, a strong but reasonably flexible material allowing vertical movement of the bottom edge over obstructions.

Each of the skirts 26 is mounted to the underside of the bed 12 to depend there from. An angle 28 extending longitudinally is bolted to rectangular mounting plates 30, which mounting plates 30 are in turn clipped to the lower flanges of the I-beams 16. The skirt 26 is sandwiched between a clamp strip 32 which provides stress relief at the lower end thereof through a larger radius curve facing the skirt 26 and the angle 28 for suspension from the bed 12.

Stabilizers 34 are attached to the underside of the bed 12 and to the skirts 26 to position the skirts 26 depending from the bed 12. The stabilizers 34 may conveniently be of high strength galvanized steel with sufficient resilience to not exceed the yield point in operation with the skirts 26. Other materials such as high impact polymer or polymer and fiber composite may be employed as well.

The stabilizers 34 may be configured as best seen in the Figures and may each be said for definitional purposes to have a first plate 36 fixed at one end to the bed 12, a second plate 38 fixed at one end to the skirt 26 and a transition curve 40 joining the first plate 36 and the second plate 38 at the other ends of each. Another mechanism which may be employed for joining the first and second plates 36, 38 is a hinge (not shown) between these plates 36, 38 with an axis extending longitudinally of the elongate bed 12. The end of the first plate 36 fixed to the bed 12 is positioned inwardly of the mounting for the adjacent skirt 26. The mounting includes a plate 42 which retains two clips 44. The clips extend toward one another to grip the bottom flanges of the associated I-beam 16. The stabilizer 34 is positioned between the plate 42 and the clips 44 with all being bolted together. The same arrangement of clips 44 is employed with the rectangular mounting plates 30 used to retain the angle 28 of the skirt 26. The first plate 36 extends inboard beneath the bed 12 toward the center of the trailer 10 from this fixed end and is not fixed to the bed 12 at this second end.

The second plate 38 extends from the inner end of the first plate 36 where they are joined. The stabilizer 34 is not affixed to the bed 12 at this intersection but may be restrained in movement by the presence of the bed 12 above the first plate 36. The second plate 38 extends laterally outwardly on the trailer 10 and downwardly to the skirt 26 at a position displaced downwardly from the location where the first plate 36 is affixed to the bed 12 adjacent to the same skirt 26. An anchor plate 46 positioned on the outboard side of the skirt 26 cooperates with the end 48 of the second plate 38 to clamp the skirt 26 there between.

Leaf springs 50 are associated with the first plates 36 where the stabilizers 34 are attached to the elongate bed 12. The leaf springs 50 are superimposed on the underside of the first plates 36 with both extending inwardly from the same mounting. The leaf springs 50 are preloaded to bias the first plates 36 upwardly toward and against the underside of the bed 12. The preloading is accomplished by forming each of the leaf springs 50 with a shallow V and then clamping the plate of the spring 50 hard against the underside of the stabilizer 34 with the concavity of the shallow V facing the stabilizer 34. By being preloaded, the leaf springs 50 are able to present a first level of force which must be overcome before the skirts 26 can move outwardly. As a result, the skirts 26 are not able to begin to move outwardly under very low forces which might result from air currents associated with motion of the vehicle. The leaf springs 50 further help to balance the forces as may be desired between resisting inward movement of the skirts 26 and outward movement of the skirts 26.

In assembly, the stabilizers 34 are shown to be spaced along each side of the semi-trailer 10 to support the two skirts 26. Spacing the stabilizers 34 uniformly will provide a more uniform response to objects or obstacles but experience may suggest alternate loading profiles. Stabilizers of other construction or function may be employed on a bed 12 in conjunction with the stabilizers 34 employed herein for certain applications to accommodate force requirements, fit and the like, most probably at one end or the other of the associated skirt 26.

The skirts 26 extend from longitudinally adjacent the landing leg assemblies 18 to longitudinally adjacent the forward and outboard tires 24 of the wheel assemblies 22. Further, the forward edges of the skirts 26 may be laterally aligned with the outboard surfaces of the wingplates 20 to streamline flow and may be clipped thereto for forward stability. The forward edges of the skirts 26 include angles on the portion most adjacent the wingplates 20 where greater rigidity is advantageous. The skirts 26 also taper at the lower corners to avoid random damage.

In operation, as a skirt 26 is forced inboard by objects or obstacles, the impacted stabilizers 34 are forced inwardly as well. The first plate 36 of these stabilizers 34 is brought into engagement with the underside of the bed 12, if not already so positioned. This engagement likely already exists because of the preload of the associated leaf spring 50. With the first plate 36 fixed, the second plate 38 is compressed at the ends to bend the second plate 38 much as experienced in a column failure. This would also occur with extreme flexing of a skirt 26 upwardly. The second plate 38 may be permanently bowed to a small extent so as to influence the direction of bending in this mode. Once the obstacle or object is overcome, the resilience in the stabilizers 34 returns the plate itself and the skirt 26 to its original position.

When the skirt is forced outboard, the second plate 38 acts principally in tension to pull at the transition curve 40 which causes the first plate 36 to bend downwardly from the bed 12. The second plate 38 is said to act principally in tension as the stiffness of the stabilizers 34 acts through the transition curve 40 as the first plate 36 is bent downwardly to place a component of torque on the second plate 38. As such, the second plate 38 does not act solely in the tension mode as the skirt 26 is forced outboard. Again, the resilience of the stabilizers 34 will return things to the original position once the obstacle or object is overcome.

The geometry of each of the stabilizers 34 provides advantageous force profiles for controlling the skirts 26. By having the second plate 38 operate in a semi-column failure mode as the skirt 26 is moved inboard, greater resistance to movement is experienced at the beginning of the movement than further along. Thus, the skirt 26 is retained in a stable position in its unstressed depending orientation but is more freely moved inboard as large obstructions and objects are surmounted. Similarly, with the leaf spring 50 creating a preload against movement by the first plate 36, a stabilizing force exists with the skirt 26 in its unstressed depending position. The more the first plate 36 is bent, the more perpendicular the force transmitted through the second plate 38 to the first plate 36. With the appropriate selection of leaf springs 50 and lengths of first plates 36, an advantageous force profile can be achieved where less resistance is experienced when surmounting large obstacles and objects.

Thus, vehicles with improved aerodynamic skirts are here disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A vehicle comprising
an elongate bed;
a skirt adjacent to either side of the elongate bed and depending there from;
stabilizers, a plurality of the stabilizers each including a first plate fixed at one end to the bed adjacent one of the skirts and extending inboard beneath the bed to a second end not fixed to the bed and a second plate extending from the second end of the first plate to meet and be fixed to the same one of the skirts at a position displaced downwardly from the fixed end of the first plate, the second plates bending with the skirts flexing inboard, the second plates being principally in tension and the first plates bending with the skirts flexing outboard.

2. The vehicle of claim 1, the plurality of stabilizers being elongate sheets further including transition curves joining the second plates to the second ends of the first plates, the elongate sheets each defining the first plate, the second plate and the transition curve there between.

3. The vehicle of claim 2, the elongate sheet being steel.

4. The vehicle of claim 1 further comprising
wheels mounted to the bed;
landing leg assemblies extending from the bed and having support structures, the skirts extending from longitudinally adjacent the landing leg assemblies to longitudinally adjacent the wheels.

5. The vehicle of claim 4, the skirts being laterally aligned with the outboard surfaces of the support structures adjacent the landing leg assemblies.

6. The vehicle of claim 5, the skirts being at the sides of the bed adjacent the wheels.

7. The vehicle of claim 6, the skirts diverging from one another from the landing leg assemblies toward the wheels.

8. The vehicle of claim 4, the skirts each including a stiffening brace along the end most adjacent the landing leg assemblies.

9. A vehicle comprising
an elongate bed;
a skirt adjacent to either side of the elongate bed and depending there from;
stabilizers, a plurality of the stabilizers each including a first plate fixed at one end to the bed adjacent one of the skirts and extending inboard beneath the bed to a second end not fixed to the bed and a second plate extending from the second end of the first plate to meet and be fixed to the same one of the skirts at a position displaced downwardly from the fixed end of the first plate;
leaf springs superimposed on the first plates and preloaded to bias the second ends of the first plates toward the bed.

10. A vehicle comprising
an elongate bed;
a skirt adjacent to either side of the elongate bed and depending there from, the skirts being laterally flexible;
stabilizers, a plurality of the stabilizers each including a first plate fixed at a first end to the bed adjacent one of the skirts and extending inboard beneath the bed to a second end not fixed to the bed and a second plate extending from the second end of the first plate to meet and be fixed to the same one of the skirts at a position displaced downwardly from the first end of the first plate, the second plates bending with the skirts flexing inboard with the first plates statically positioned against the underside of the bed, the second plates being principally in tension and the first plates bending downwardly from the bed with the skirts flexing outboard.

11. A vehicle comprising
an elongate bed;
a skirt adjacent to either side of the elongate bed and depending there from, the skirts being laterally flexible;
stabilizers, a plurality of the stabilizers each including a first plate fixed at a first end to the bed adjacent one of the skirts and extending inboard beneath the bed to a second end not fixed to the bed and a second plate extending from the second end of the first plate to meet and be fixed to the same one of the skirts at a position displaced downwardly from the first end of the first plate, the second plates bending with the skirts flexing inboard with the first plates statically positioned against the underside of the bed, the second plates being principally in tension and the first plates bending downwardly from the bed with the skirts flexing outboard;
leaf springs superimposed on the first plates and preloaded to bias the first plates toward the bed.

12. A vehicle comprising
an elongate bed;
a skirt adjacent to either side of the elongate bed, depending from the elongate bed and having a bottom edge;
stabilizers, a plurality of the stabilizers each including a first plate fixed at a first end to the bed adjacent one of the skirts and extending inboard beneath the bed to a second end and a second plate extending from the second end of the first plate to meet and be fixed to the same one of the skirts at a position displaced downwardly from the first end of the first plate, the skirts being laterally flexible from their dependency at the elongate bed to at least the skirt position displaced downwardly from the first end of the first plate fixed to the second end of the first plate, the plurality of stabilizers not otherwise being connected to the bed or the skirts, the second plates bending with the skirts flexing inboard with the second ends of the first plates statically positioned against the underside of the bed, the second plates being principally in tension and the first plates bending downwardly from the bed with the skirts flexing outboard.

13. The vehicle of claim 12 further comprising
leaf springs superimposed on the first plates and preloaded to bias the first plates toward the bed.

14. The vehicle of claim 12, the plurality of stabilizers being elongate sheets further including transition curves joining the second plates to the second ends of the first plates, the elongate sheets each defining the first plate, the second plate and the transition curve there between.

* * * * *